(12) United States Patent
Sugiura et al.

(10) Patent No.: US 10,077,833 B2
(45) Date of Patent: Sep. 18, 2018

(54) FLUID PRESSURE CONTROL CIRCUIT FOR TRANSMISSION

(71) Applicant: AISIN SEIKI KABUSHIKI KAISHA, Kariya-shi, Aichi-ken (JP)

(72) Inventors: Eiji Sugiura, Nagoya (JP); Noriyoshi Kondoh, Nagoya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 524 days.

(21) Appl. No.: 14/867,482

(22) Filed: Sep. 28, 2015

(65) Prior Publication Data

US 2016/0091084 A1    Mar. 31, 2016

(30) Foreign Application Priority Data

Sep. 29, 2014   (JP) ................................ 2014-198125

(51) Int. Cl.
*F16H 61/02*     (2006.01)
*F16H 61/00*     (2006.01)
*F16H 61/12*     (2010.01)

(52) U.S. Cl.
CPC ..... *F16H 61/0021* (2013.01); *F16H 61/0251* (2013.01); *F16H 61/0267* (2013.01);
(Continued)

(58) Field of Classification Search
None
See application file for complete search history.

(56) References Cited

U.S. PATENT DOCUMENTS

| | | | | |
|---|---|---|---|---|
| 4,345,489 A | * | 8/1982 | Muller | ................ F16H 61/0021 |
| | | | | 475/127 |
| 4,628,771 A | * | 12/1986 | Person | ................ F16H 61/0206 |
| | | | | 475/116 |

(Continued)

FOREIGN PATENT DOCUMENTS

JP    63-210443 A    9/1988
JP    2000240776 A   9/2000

OTHER PUBLICATIONS

Japanese Office Action dated Apr. 17, 2018 issued by the Japanese Patent Office in corresponding Japanese Patent Application No. 2014-198125, with English translation (6 pages).

*Primary Examiner* — John Fox
(74) *Attorney, Agent, or Firm* — Buchanan Ingersoll & Rooney PC

(57) ABSTRACT

A fluid pressure control circuit for a transmission, includes plural electromagnetic valves each switching one of engagement elements between an engaged state and a disengaged state, plural passages configured to connect the engagement elements to a fluid pressure source, a first electromagnetic valve corresponding to one of the electromagnetic valves and switching one of the engagement elements between the engaged and disengaged states, a second electromagnetic valve corresponding to another of the electromagnetic valves and switching another of the engagement elements between the engaged and disengaged states, and a shut-off valve, when the first electromagnetic valve and the second electromagnetic valve are open, closing the passages among the first electromagnetic valve, the engagement elements switched by the first electromagnetic valve and the fluid pressure source with the use of the fluid pressure to establish a closed state, and maintaining the closed state with the use of the fluid pressure.

3 Claims, 4 Drawing Sheets

(52) U.S. Cl.
CPC .............. *F16H 2061/0253* (2013.01); *F16H 2061/1236* (2013.01); *F16H 2061/1252* (2013.01)

(56) References Cited

U.S. PATENT DOCUMENTS

| | | | | |
|---|---|---|---|---|
| 4,756,213 | A | * | 7/1988 | Mainquist ............... F16H 61/12 477/125 |
| 4,903,551 | A | * | 2/1990 | Hiramatsu .......... F16H 61/0206 477/131 |
| 4,987,798 | A | * | 1/1991 | Funahashi ............... F16H 61/10 477/119 |
| 5,528,949 | A | * | 6/1996 | Stainton .................. F16H 3/095 74/335 |
| 6,702,702 | B2 | * | 3/2004 | Godecke ................. F16H 61/12 192/48.601 |
| 7,410,438 | B2 | * | 8/2008 | Moehlmann ............ F16H 61/12 192/3.58 |

* cited by examiner

|   | C1 | C2 | C3 | B1 | B2 |
|---|----|----|----|----|----|
| P |    |    |    |    | ○  |
| R |    |    | ○  |    | ○  |
| N |    |    |    |    | ○  |
| 1 | ○  |    |    |    | ○  |
| 2 | ○  |    |    | ○  |    |
| 3 | ○  |    | ○  |    |    |
| 4 | ○  | ○  |    |    |    |
| 5 |    | ○  | ○  |    |    |
| 6 |    | ○  |    | ○  |    |

…

FLUID PRESSURE CONTROL CIRCUIT FOR TRANSMISSION

CROSS REFERENCE TO RELATED APPLICATIONS

This application is based on and claims priority under 35 U.S.C. § 119 to Japanese Patent Application 2014-198125, filed on Sep. 29, 2014, the entire content of which is incorporated herein by reference.

TECHNICAL FIELD

This disclosure generally relates to a fluid pressure control circuit for a transmission.

BACKGROUND DISCUSSION

A fluid pressure control circuit is conventionally known, which is used for a transmission provided with plural rotary elements, a fixed element, and plural engagement portions switching between an engaged state and a disengaged state of the rotary element, and one of the rotary element and the fixed element, and which can restrict the plural engagement portions from being in the engaged state in parallel with each other (for example, JPS63-210443A which will be hereinafter referred to as Patent reference 1).

With regards to a fluid pressure control circuit for a transmission, it may be desirable that a state, in which plural engagement members are restricted by the fluid pressure control circuit from being in engaged states in parallel with each other, is continued.

SUMMARY

According to an aspect of this disclosure, a fluid pressure control circuit for a transmission, the transmission includes a fluid pressure source, and a plurality of engagement elements switching between an engaged state and a disengaged state with the use of fluid pressure of fluid provided from the fluid pressure source, a first rotary element of the transmission being engaged with one of a second rotary element of the transmission and a fixed element of the transmission in the engaged state, the first rotary element being disengaged from the one of the second rotary element and the fixed element in the disengaged state, the fluid pressure control circuit includes a plurality of electromagnetic valves each switching one of the engagement elements between the engaged state and the disengaged state, one each of the electromagnetic valves being arranged at each of the plurality of engagement elements, a plurality of passages configured to connect the engagement elements to the fluid pressure source, a first electromagnetic valve corresponding to one of the plurality of electromagnetic valves, and switching one of the plurality of engagement elements between the engaged state and the disengaged state, a second electromagnetic valve corresponding to another of the plurality of electromagnetic valves, and switching another of the plurality of engagement elements between the engaged state and the disengaged state, and a shut-off valve, in a case where the first electromagnetic valve and the second electromagnetic valve are open, closing the passages among the first electromagnetic valve, the engagement elements switched by the first electromagnetic valve and the fluid pressure source with the use of the fluid pressure to establish a closed state, the shut-off valve maintaining the closed state with the use of the fluid pressure.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment disclosed here will be described below. A configuration of the embodiment described hereunder, and an operation, result, and advantage and effect that are brought by the configuration are adapted as an example. The present disclosure may be realized with other configuration than the configuration disclosed in the following embodiment. Further, at least one of various advantages and effects and derivative advantages and effects which are based on the basic configuration may be obtained.

Figures 1, 2:
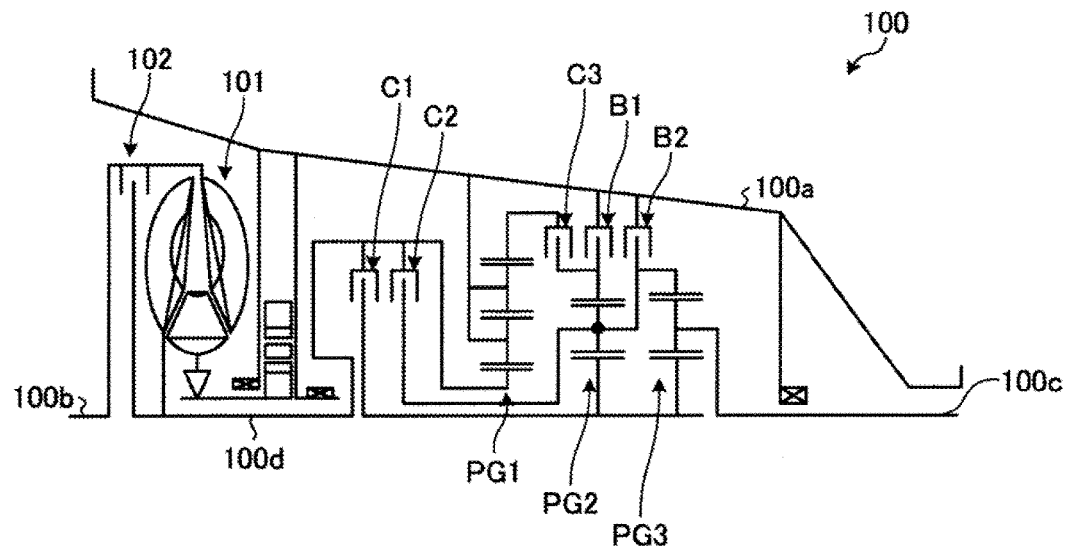
FIG. 1 is a schematic and exemplary cross-sectional view of a transmission serving as an object of application of a fluid control circuit of an embodiment disclosed here, which shows one side of the transmission relative to a rotational center.
FIG. 2 is a table illustrating an example of combinations of engaged states and disengaged states of plural engagement elements of the transmission in each condition according to the embodiment.

As illustrated in FIG. 1, a transmission 100 includes a case 100a. The case 100a accommodates therein, for example, an input shaft 100b, a lockup clutch 102, a torque converter 101, an intermediate shaft 100d, plural planetary gears PG1, PG2 and PG3, and an output shaft 100c which serve as plural rotary elements (i.e., a first rotary element and a second rotary element). Rotations are decelerated by the planetary gears PG1 to PG3.

The transmission 100 includes engagement members or engagement elements C1, C2, C3, B1 and B2 to change a reduction ratio, for example. The engagement elements C1 to C3, B1 and B2 are configured to switch between an engaged state in which two structural elements are engaged with each other, and a disengaged state in which the two structural elements are disengaged from each other, that is, the engagement of the two structural elements with each other is interrupted. The engagement elements C1 to C3 are referred to as clutches, and switch the engagement and disengagement of two of the rotary elements relative to each other. The engagement elements B1 and B2 are referred to as brake, and switch the engagement and disengagement of the rotary element and a fixed element relative to each other. In the example illustrated in FIG. 1, for example, the intermediate shaft 100d, and/or a sun gear, a planet gear, a ring gear, a carrier which constitute each of the planetary gears PG1 to PG3 are examples of the rotary elements each serving as an object of the engagement and disengagement that are performed by the engagement elements C1 to C3, B1 and B2. The case 100a is an example of the fixed element serving as an object of the engagement and disengagement that are performed by the engagement elements B1 and B2. The engagement elements C1 to C3, B1 and B2 switch between the engaged state and the disengaged state with the use of fluid pressure of fluid provided from a pump 22, which will be described later.

Specifically, in the example illustrated in FIG. 1, the engagement element C1 switches the engagement and disengagement of the intermediate shaft 100d and the sun gear of the planetary gear PG1, and sun gears of the planetary gear PG2 and the planetary gear PG3. The engagement element C2 switches the engagement and disengagement of the intermediate shaft 100d and the sun gear of the planetary gear PG1, and the carrier of the planetary gear PG2 and the ring gear of the planetary gear PG3. The engagement element C3 switches the engagement and disengagement of the ring gear of the planetary gear PG1 and the ring gear of the planetary gear PG2. The engagement element B1 switches the engagement and disengagement of the ring gear of the planetary gear PG2 and the case 100a. The engagement element B2 switches the engagement and disengagement of the carrier of the planetary gear PG2, the ring gear of the planetary gear PG3, and the case 100a.

FIG. 2 illustrates an example of combinations of the engagement and disengagement of the engagement elements C1 to C3, B1 and B2 in each condition. In FIG. 2, the parking range is indicated as "P", the reverse range is indicated as "R", the neutral position is indicated as "N", the first stage to the sixth stage are indicated as "1" to "6", respectively. In FIG. 2, the horizontal rows correspond to the conditions of the parking, the reverse range, the neutral position, and the first to sixth stages, respectively. In each horizontal row, the engagement element C1 to C3, B1 and B2 to which a circle mark is applied represents that the engagement element is in the engaged state, and the engagement element C1 to C3, B1 and B2 to which no symbol is applied represents that the engagement element is in the disengaged state. By controlling the switching of the engagement elements C1 to C3, B1 and B2, the transmission 100 switches the combinations in which the rotary element and/or the fixed element are engaged with each other in each of the conditions, and accordingly the state of the reduction ratio, for example, is switched.

Figure 3:
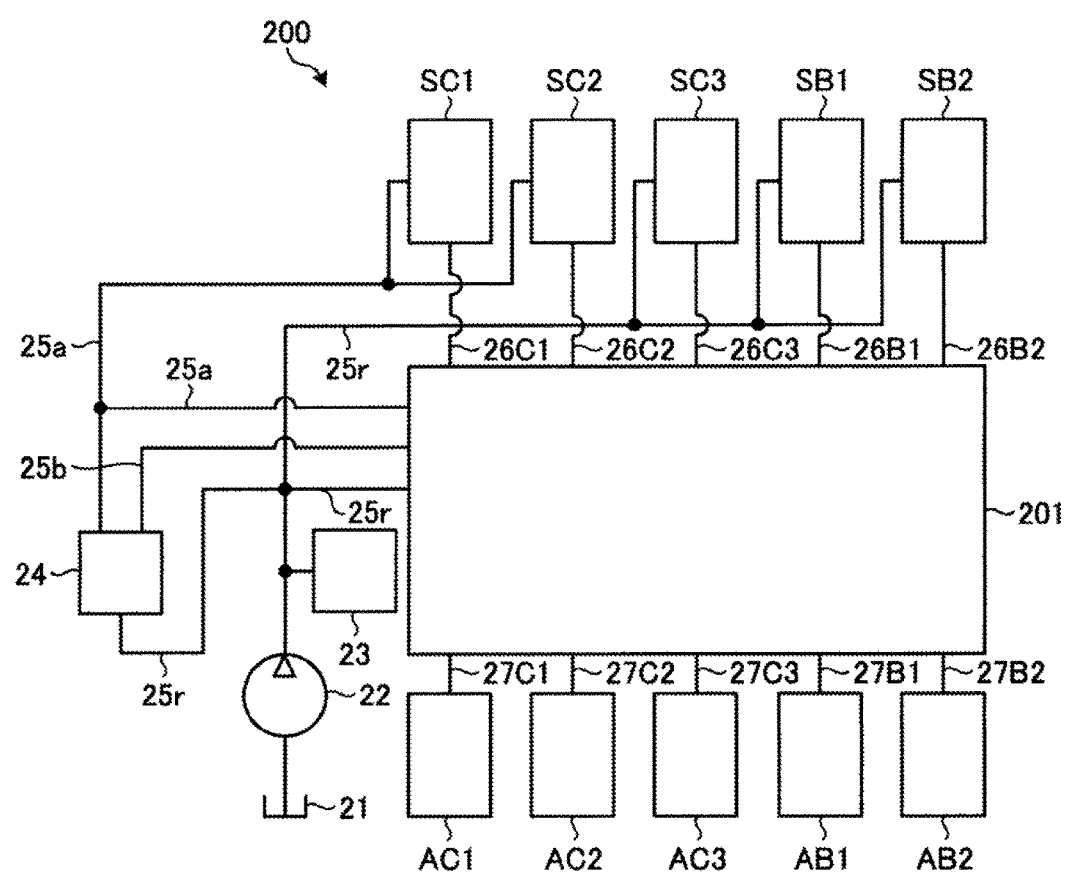
FIG. 3 is a schematic and exemplary view of a configuration of the fluid control circuit according to the embodiment.

FIG. 3 illustrates an example of a fluid pressure control circuit 200 for switching the engagement and disengagement of the engagement elements C1 to C3, B1 and B2.

The fluid control circuit 200 includes actuators AC1, AC2, AC3, AB1 and AB2 which correspond to the engagement elements C1, C2, C3, B1 and B2, respectively. Each of the actuators AC1 to AC3, AB1 and AB2 includes a movable portion and each of the actuators AC1 to AC3, AB1 and AB2 is provided with a chamber. By controlling fluid pressure of fluid in the chambers, the fluid pressure control circuit 200 switches the engaged states and the disengaged states of the engagement elements C1 to C3, and B1 and B2. For example, the fluid corresponds to automatic transmission fluid (ATF), and may be referred to also as operating liquid, working fluid and/or fluid.

Electromagnetic valves SC1, SC2, SC3, SB1 and SB2 are provided to correspond to the actuators AC1, AC2, AC3, AB1 and AB2, respectively. By switching open and closed states of the electromagnetic valves SC1 to SC3, SB1 and SB2, positions of the movable portions of the corresponding actuators AC1 to AC3, AB1 and AB2 are controlled. Accordingly, the engaged states and disengaged states of the engagement elements C1 to C3, B1 and B2 are switched. Each of the electromagnetic valves SC1 to SC3, SB1 and SB2 is a linear solenoid, for example. In a case where the linear solenoids are used as the electromagnetic valves SC1 to SC3, SB1 and SB2, changes in opening degrees of the electromagnetic valves SC1 to SC3, SB1 and SB2 can be controlled by controlling electric power of the solenoids of the electromagnetic valves SC1 to SC3, SB1 and SB2. Consequently, for example, it is restricted that the positions of the movable portions of the actuators AC1 to AC3, AB1 and AB2 are changed rapidly, and thus it is restricted that the engaged state and the disengaged state of the engagement elements C1 to C3, B1 and B2 are switched rapidly. The electromagnetic valves SC1 to SC3, SB1 and SB2 may include normally open valves that are closed when being electrified and normally closed valves that are open when being electrified. The opening and closing of the electromagnetic valves SC1 to SC3, SB1 and SB2 is controlled by, for example, ECU serving as an electric control circuit.

The fluid pressure control circuit 200 includes a pump 22 serving as a fluid pressure source. The pump 22 intakes the fluid from an oil pan 21 and discharges the fluid.

A regulator 23 is arranged at a discharge-side of the pump 22. The regulator 23 controls pressure of fluid, that is, line pressure, in each of the passages 25r, 25a and 25b.

A switch valve 24 is arranged at a downstream-side of the pump 22. For example, the switch valve 24 is configured to switch a connection state of the passage 25r, and the passages 25a and 25b with each other between the forward moving and the reverse moving. In an example illustrated in FIG. 3, at the forward moving, the switch valve 24 connects the passage 25r, which is connected to the regulator 23, and the passage 25a, which is connected for example to the electromagnetic valves SC1 and SC2, with each other. In addition, the switch valve 24 disconnects the passage 25r and the passage 25b from each other at the forward moving. At the reverse moving, the switch valve 24 connects the passage 25r and the passage 25b, which is connected to the fluid pressure circuit 201, with each other. In addition, the switch valve 24 disconnects the passage 25r and the passage 25a from each other at the reverse moving.

The electromagnetic valves SC1 and SC2 switch open and closed states between the passage 25a, and passages 26C1 and 26C2. The passages 26C1 and 26C2 are connectable, via the fluid pressure circuit 201, to passages 27C1 and 27C2 which are linked to or connected to the actuators AC1 and AC2, respectively. That is, when the electromagnetic valve SC1 is open, the actuator AC1 of the engagement element C1 is connected with the pump 22 serving as the fluid pressure source via the passage 27C1, the fluid pressure circuit 201, the passage 26C1, the opened electromagnetic valve SC1, the passage 25a, the opened switch valve 24 and the passage 25r. When the electromagnetic valve SC2 is open, the actuator AC2 of the engagement element C2 is connected with the pump 22 serving as the fluid pressure source via the passage 27C2, the fluid pressure circuit 201, the passage 26C2, the opened electromagnetic valve SC2, the passage 25a, the opened switch valve 24 and the passage 25r.

The electromagnetic valves SC3, SB1 and SB2 switch open and closed states between the passage 25r, and passages 26C3, 26B1 and 26B2. The passages 26C3, 26B1 and 26B2 are connectable, via the fluid pressure circuit 201, to passages 27C3, 27B1 and 27B2 which are connected to the actuators AC3, AB1 and AB2, respectively. That is, when the electromagnetic valve SC3 is open, the actuator AC3 of the engagement element C3 is connected to the pump 22 serving as the fluid pressure source via the passage 27C3, the fluid pressure circuit 201, the passage 26C3, the opened electromagnetic valve SC3 and the passage 25r. When the electromagnetic valve SB1 is open, the actuator AB1 of the engagement element B1 is connected to the pump 22 serving as the fluid pressure source via the passage 27B1, the fluid pressure circuit 201, the passage 26B1, the opened electromagnetic valve SB1 and the passage 25r. When the electromagnetic valve SB2 is open, the actuator AB2 of the engagement element B2 is connected to the pump 22 serving as the fluid pressure source via the passage 27B2, the fluid pressure circuit 201, the passage 26B2, the opened electromagnetic valve SB2 and the passage 25r.

That is, the fluid pressure circuit 201 is provided with a passage which can connect the passage 26C1 and the passage 27C1 to each other, a passage which can connect the passage 26C2 and the passage 27C2 to each other, a passage which can connect the passage 26C3 and the passage 27C3 to each other, a passage which can connect the passage 26B1 and the passage 27B1 to each other, and a passage which can connect the passage 26B2 and the passage 27B2 to each other. In addition to the passages, the fluid pressure circuit 201 includes a safety valve, a check valve and an accumulator, for example.

Figure 4:
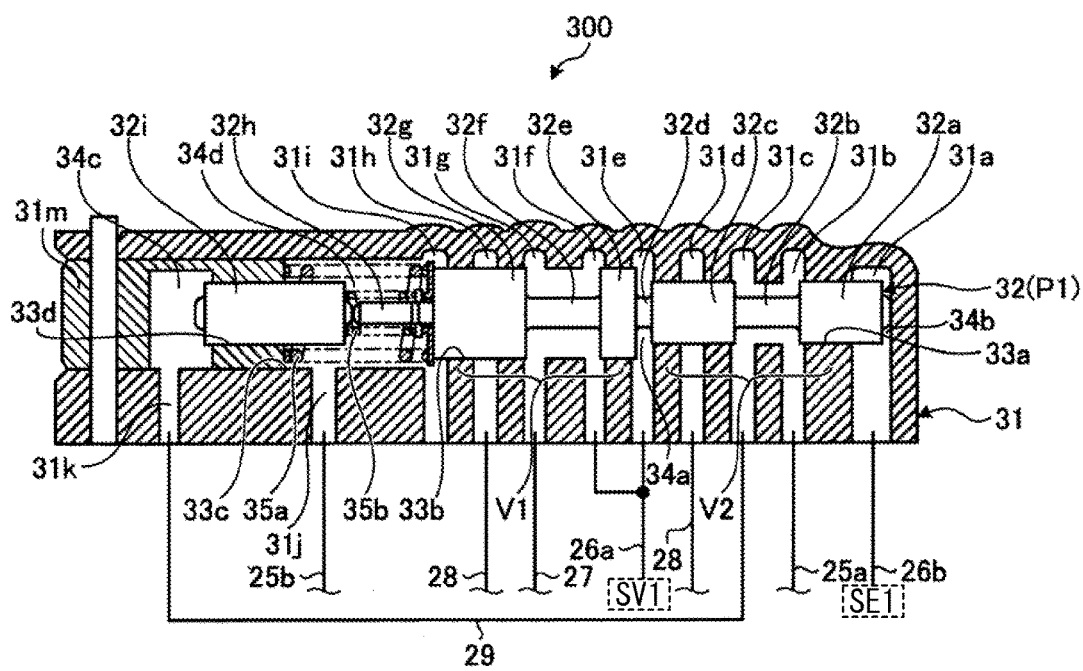
FIG. 4 is an exemplary cross-sectional view of a shut-off valve of the fluid control circuit according to the embodiment, which illustrates a state in which a spool that is an example of a valve body is at a first position.
Figure 5:
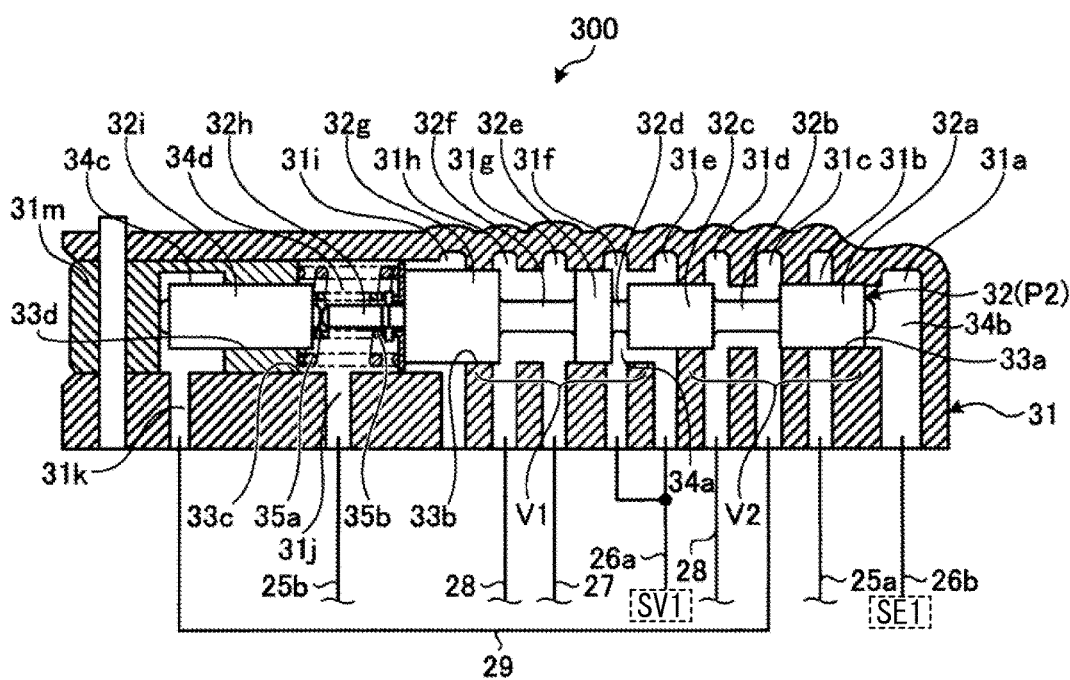
FIG. 5 is an exemplary cross-sectional view of the shut-off valve of the fluid control circuit according to the embodiment, which illustrates a state in which the spool is at a second position.
Figure 6:
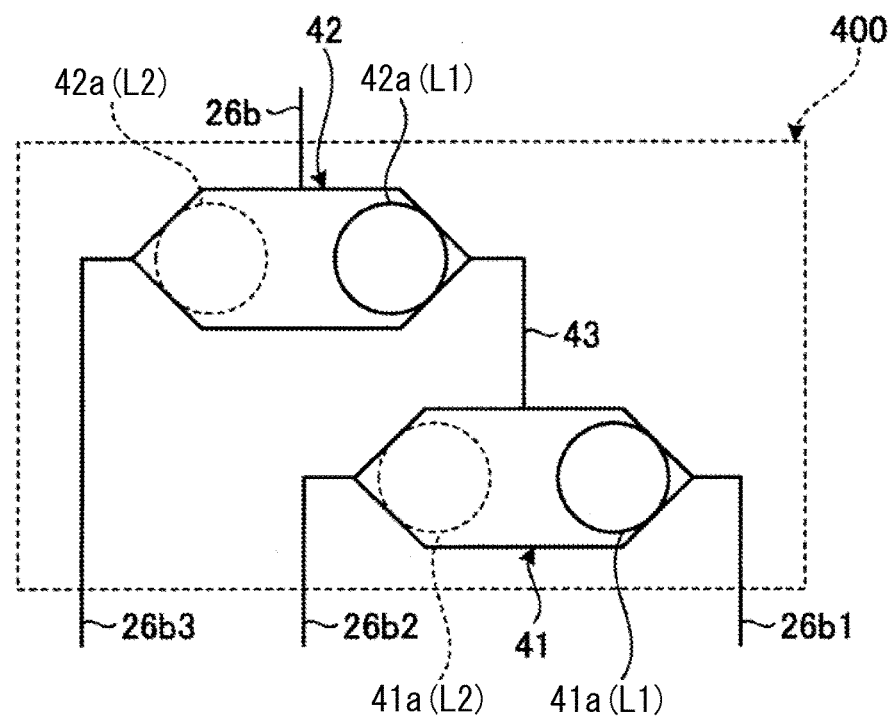
FIG. 6 is a schematic and exemplary view of a configuration of a selector valve of the fluid control circuit according to the embodiment.

Further, for example, the fluid pressure circuit 201 includes a shut-off valve 300 illustrated in each of FIGS. 4 and 5, and a selector valve 400 illustrated in FIG. 6, in consideration of fail-safe in the event of failure or abnormality of the electromagnetic valves SC1 to SC3, SB1 or SB2. Depending on the configuration of the planetary gears PG1 to PG3 of the transmission 100, there exists a combination of the engagement elements C1 to C3, B1 and B2 which should not be in the engaged states at the same time. The shut-off valve or cut-off valve 300 is connected to plural passages connected to the respective actuators AC1 to AC3, AB1 and AB2 of the plural engagement elements C1 to C3, B1 and B2 which form the above-described combination. The shut-off valve 300 is mechanically operated by pressures of the plural passages, thereby closing or interrupting at least one of the plural passages. From among plural passages 26b1, 26b2 and 26b3, the selector valve 400 selectively connects the passage in which the pressure of the fluid is the highest to the shut-off valve 300.

First, an example of the shut-off valve 300 will be described with reference to FIGS. 4 and 5. The shut-off valve 300 includes a body 31 and a spool 32 (i.e., a valve body). The body 31 is provided with opening portions 33a, 33b, 33c and 33d each formed in a cylindrical shape. The spool 32 includes a configuration where circular columns are arranged in an axial direction. The spool 32 is accommodated within the opening portions 33a to 33d to be movable along the axial direction. The spool 32 is configured to move between a first position P1 illustrated in FIG. 4 and a second position P2 illustrated in FIG. 5. The right side in each of FIG. 4 and FIG. 5 will be hereinafter referred to as a first side in the axial direction and the left side in each of FIG. 4 and FIG. 5 will be hereinafter referred to as a second side in the axial direction. An appropriate clearance is provided between an outer circumferential surface of the spool 32 and inner circumferential surfaces of the corresponding opening portions 33a to 33d. The body 31 may be also referred to as a cylinder or a sleeve. The shut-off valve 300 is configured as a spool valve. The spool 32 is an example of the valve body.

The spool 32 is generally configured in an elongated circular column including steps. The spool 32 includes large diameter portions 32a, 32c, 32e, 32g, 32i and small diameter portions 32b, 32d, 32f, 32h. The large diameter portions 32a, 32c, 32e, 32g, 32i may be also referred to as expanded diameter portions, projected portions or protruding portions. The small diameter portions 32b, 32d, 32f, 32h may be also referred to as reduced diameter portions, narrowed portions or recessed portions.

The large diameter portions 32a, 32c, 32e, 32g, 32i of the spool 32 include the large diameter portions of which diameters differ from one another. Specifically, the large diameter portion 32a, the large diameter portion 32c and the large diameter portion 32i include the same diameter as one another, and the large diameter portion 32e and the large diameter portion 32g include the same diameter as each other. The diameter of the large diameter portion 32e and the large diameter portion 32g is larger than the diameter of the large diameter portion 32a, the large diameter portion 32c and the large diameter portion 32i. The large diameter portions 32a and 32c are accommodated in the opening portion 33a of the body 31, the large diameter portions 32e and 32g are accommodated in the opening portion 33b, and the large diameter portion 32i is accommodated in the opening portion 33d.

The body 31 is provided with plural ports 31a to 31k facing the opening portions 33a to 33d. The ports 31a to 31d face the opening portion 33a, the ports 31e to 31h face the opening portion 33b, the ports 31i and 31j face the opening portion 33c, and the port 31k faces the opening portion 33d.

The shut-off valve 300 is provided with plural chambers 34a, 34b, 34c and 34d. The first chamber 34a is provided to face the large diameter portion 32e from the first side in the axial direction, that is, from the right side in FIGS. 4 and 5. The first chamber 34a is connected to the ports 31e and 31f, and the ports 31e and 31f are connected to a passage 26a connected to any of the electromagnetic valves SC1 to SC3, SB1 and SB2. Due to the pressure of the fluid of the first chamber 34a, the spool 32 receives a force towards the second side in the axial direction, that is, towards the left side in FIGS. 4 and 5.

The second chamber 34b is provided to face the large diameter portion 32a of the spool 32 from the first side in the axial direction. The second chamber 34b is connected to the port 31a, and the port 31a is connected to a passage 26b connected to any of the electromagnetic valves SC1 to SC3, SB1 and SB2. The passage 26b is connected to other electromagnetic valve SC1 to SC3, SB1 and SB2 than the electromagnetic valve SC1 to SC3, SB1 and SB2 that is connected to the passage 26a. Due to the pressure of the fluid in the second chamber 34b, the spool 32 receives a force towards the second side in the axial direction, that is, towards the left side in FIGS. 4 and 5.

The third chamber 34c is provided to face the large diameter portion 32i from the second side in the axial direction. The third chamber 34c is connected to the port 31k, and the port 31k is connected to a passage 29. The passage 29 is connected to one of the passage 25a and a passage 28, via a second valve portion V2. Due to the pressure of the fluid of the third chamber 34c, the spool 32 receives a force towards the first side in the axial direction, that is, towards the right side in FIGS. 4 and 5.

The fourth chamber 34d is provided to face the large diameter portion 32g from the second side in the axial direction. Resilient members 35a and 35b are accommodated in the fourth chamber 34d to intervene or to be arranged between a plug 31m that is part of the body 31, and the large diameter portion 32g. The resilient members 35a and 35b are, for example, coil springs functioning as compression springs. Due to a compression reaction force of the resilient members 35a and 35b, the spool 32 receives a force towards the first side in the axial direction, that is, towards the right side in FIGS. 4 and 5.

The first position P1 and the second position P2 of the spool 32 are determined by balance between the pressure of the fluid in each chamber 34a to 34c and the compression reaction force of the resilient members 35a and 35b. In the example of in FIGS. 4 and 5, the shut-off valve 300 is structured in such a manner that the spool 32 is positioned at the first position P1 illustrated in FIG. 4 in a case of the following (1) and in a case of the following (2). (1) The pressures of the fluids in the first chamber 34a and the third chamber 34c are higher than predetermined pressures, and the pressure of the fluid in the second chamber 34b is lower than a predetermined pressure. (2) The pressures of the fluids in the second chamber 34b and the third chamber 34c are higher than the predetermined pressures, and the pressure of the fluid in the first chamber 34a is lower than the predetermined pressure. In a case where (1) is established and in a case where (2) is established, the force towards the first side in the axial direction, that is, the force towards the right side in the FIGS. 4 and 5, that acts on the spool 32 due to the resilient members 35a and 35b and the pressure of the fluid of the third chamber 34c is larger than the force towards the second side in the axial direction, that is, the force towards the left side in the FIGS. 4 and 5, that acts on the spool 32 due to the pressures of the fluids in the first chamber 34a and the second chamber 34b. The predetermined pressures are set to be lower than lower limits of the pressures that are actually applied, so that the above-described effects are obtained by the lower limits of the pressures actually applied. In a case where the pressure is lower than the predetermined pressure, the pressure is, for example, atmospheric pressure.

The shut-off valve 300 is structured in such a manner that the spool 32 is moved to or is positioned at the second position P2 illustrated in FIG. 5 in a case of the following (3) to (6). (3) The pressures of the fluids in the first chamber 34a, the second chamber 34b and the third chamber 34c are higher than the predetermined pressures. (4) The pressures of the fluids in the first chamber 34a and the second chamber 34b are higher than the predetermined pressures and the pressure of the fluid in the third chamber 34c is lower than the predetermined pressure. (5) The pressure of the fluid in the first chamber 34a is higher than the predetermined pressure, and pressures of the fluids of the second chambers 34b and the third chambers 34c are lower than the predetermined pressures. (6) The pressure of the fluid in the second chamber 34b is higher than the predetermined pressure, and the pressures of the fluids in the first chamber 34a and the third chamber 34c are lower than the predetermined pressures. In cases where any of (3) to (6) is established, the force towards the first side in the axial direction, that is, the force towards the right side in the FIGS. 4 and 5, that acts on the spool 32 due to the resilient members 35a and 35b and the pressure of the fluid of the third chamber 34c is smaller than the force towards the second side in the axial direction, that is, the force towards the left side in the FIGS. 4 and 5, that acts on the spool 32 due to the pressures of the fluids of the first chamber 34a and the second chamber 34b.

In the configuration of FIGS. 4 and 5, absolute values of magnitudes of the forces acting on the spool 32 due to the pressures of the respective fluids of the first chamber 34a, the second chamber 34b and the third chamber 34c are set to be substantially equal to one another. In addition, an absolute value of a magnitude of the force acting on the spool 32 due to the resilient members 35a and 35b is set to be smaller than the absolute value of the magnitude of the force acting on the spool 32 due to the pressure of the respective fluids of the first chamber 34a, the second chamber 34b and the third chamber 34c. Consequently, the conditions of the above-described (1) to (6) may be satisfied. In addition, in the present embodiment, the diameter of the large diameter portion 32e is configured to be larger than the diameter of the large diameter portion 32c so that the force caused by the pressure of the first chamber 34a and the force caused by the pressure of the second chamber 34b apply in parallel with each other towards the second side in the axial direction, that is, towards the left side in FIGS. 4 and 5.

The shut-off valve 300 is provided with a first valve portion V1. For convenience, the electromagnetic valve, the actuator and the engagement element which correspond to the first valve portion V1 will be referred to as a first electromagnetic valve SV1, an actuator AV1 and an engagement element CV1, respectively. The first electromagnetic valve SV1 is any one of the electromagnetic valves SC1 to SC3, SB1 and SB2, the actuator AV1 is any one of the actuators AC1 to AC3, AB1 and AB2, and the engagement element CV1 is any one of the engagement elements C1 to C3, B1 and B2.

The first valve portion V1 is provided to correspond to the ports 31f, 31g and 31h. As the spool 32 moves, the first valve portion V1 switches a connection state, and open and closed states among the ports 31f, 31g and 31h with the use of the large diameter portions 32e and 32g. The port 31f is connected to the passage 26a, and the passage 26a is connected to the first electromagnetic valve SV1. The port 31g is connected to a passage 27, and the passage 27 is connected to the actuator AV1 of the engagement element CV1 corresponding to the first electromagnetic valve SV1. The port 31h is connected to a passage 28, and the passage 28 is connected to the oil pan 21. The passage 26a is any of the passages 26C1 to 26C3, 26B1, 26B2. The passage 27 is any of the passages 27C1 to 27C3, 27B1 and 27B2. The passages 26a and 27 are the passages between the first electromagnetic valve SV1 and the engagement element CV1.

As illustrated in FIG. 4, in a state where the spool 32 is positioned at the first position P1, the passage 26a and the passage 27 are connected to each other via a passage formed around the small diameter portion 32f within the opening portion 33b. In addition, the passage 28, and the passages 26a and 27 are disconnected from each other due to the large diameter portion 32g. Accordingly, in the state where the spool 32 is positioned at the first position P1, the first electromagnetic valve SV1 and the actuator AV1 of the engagement element CV1 corresponding to the first electromagnetic valve SV1 are connected to each other through the first valve portion V1.

On the other hand, as illustrated in FIG. 5, in a state where the spool 32 is positioned at the second position P2, the passage 27 and the passage 28 are connected to each other via the passage formed around the small diameter portion 32f within the opening portion 33b.

Accordingly, in a state where the spool 32 is positioned at the first position P1, the passage 27 connected to the actuator AV1 of the engagement element CV1 is connected, via the first valve portion V1, to the passage 26a connected to the first electromagnetic valve SV1 corresponding to the engagement element CV1. In a state where the spool 32 is positioned at the second position P2, the passage 27 connected to the actuator AV1 of the engagement element CV1 is connected, via the first valve portion V1, to the passage 28 connected to the oil pan 21.

Further, the shut-off valve 300 is provided with the second valve portion V2. The second valve portion V2 is provided to correspond to the ports 31b, 31c, and 31d. As the spool 32 moves, the second valve portion V2 switches a connection state, and open and closed states between the ports 31b, 31c and 31d, with the use of the large diameter portions 32a and 32c. The port 31b is connected to the passage 25a, and the passage 25a is connected to the switch valve 24 as illustrated in FIG. 3. The port 31c is connected to the passage 29, and the passage 29 is connected to the third chamber 34c. The port 31d is connected to the passage 28, and the passage 28 is connected to the oil pan 21. The passage 25a may be the passage 25r illustrated in FIG. 3.

As illustrated in FIG. 4, in a state where the spool 32 is positioned at the first position P1, the passage 25a and the passage 29 are connected to each other via a passage formed around the small diameter portion 32b within the opening portion 33a. In addition, the passage 28, and the passages 25a and 29 are disconnected from each other by the large diameter portion 32c. Accordingly, in this state, the switch valve 24 and the third chamber 34c are connected to each other through the second valve portion V2.

On the other hand, as illustrated in FIG. 5, in a state where the spool 32 is positioned at the second position P2, the passage 28 and the passage 29 are connected to each other via the passage formed around the small diameter portion 32b within the opening portion 33a.

Accordingly, in a state where the spool 32 is positioned at the first position P1, the passage 29 connected to the third chamber 34c is connected, via the second valve portion V2, to the passage 25a connected to the pump 22. In a state where the spool 32 is positioned at the second position P2, the passage 29 connected to the third chamber 34c is connected, via the second valve portion V2, to the passage 28 connected to the oil pan 21.

In addition, the passage 26b connected to the second chamber 34b is connected to any of the electromagnetic valves SC1 to SC3, SB1 and SB2, the any of the electromagnetic valves SC1 to SC3, SB1 and SB2 being other electromagnetic valve than the first electromagnetic valve SV1 to which the first valve portion V1 correspond. For convenience, the electromagnetic valve connected to the passage 26b will be referred to as a second electromagnetic valve SE1. Any of the actuators AC1 to AC3, AB1, AB2 corresponding to the second electromagnetic valve SE1 will be referred to as an actuator AE1. Any of the engagement elements C1 to C3, B1 and B2 corresponding to the second electromagnetic valve SE1 will be referred to as an engagement element CE1. As described above, the combination of the engagement elements C1 to C3, B1 and B2 exists which should not be in the engaged states at the same time because of the structure of the transmission 100. The first electromagnetic valve SV1 and the second electromagnetic valve SE1 correspond to the engagement element CV1 and the engagement element CE1, respectively, which form the combination of the engagement elements that should not be in the engaged states at the same time. The passage 26b is any of the passages 26C1 to 26C3, 26B1 and 26B2, and the passage 26b is the passage connected to the second electromagnetic valve SE1.

An operation of the shut-off valve 300 will be explained as exemplified in FIGS. 4 and 5. First, an explanation is made on (a) State in which the spool 32 is positioned at the first position P1, the first electromagnetic valve SV1 is open, and the second electromagnetic valve SE1 is closed. In this state, the first chamber 34a is connected to the pump 22 via the passage 26a, the opened first electromagnetic valve SV1, the passage 25a, the switch valve 24 and the passage 25r. Accordingly, the pressure of the first chamber 34a is the line pressure. The passage 26b connected to the second chamber 34b is disconnected from the pump 22 because the second electromagnetic valve SE1 is closed. Accordingly, the pressure of the second chamber 34b is lower than the predetermined pressure and is, for example, the atmospheric pressure. In addition, the third chamber 34c is connected to the pump 22 via the passage 29, the second valve portion V2, the passage 25a, the switch valve 24 and the passage 25r. Accordingly, the pressure of the third chamber 34c is the line pressure. This case corresponds to the case (1) described before, and the spool 32 is kept or maintained at the first position P1. In addition, in this case, the engagement element CV1 corresponding to the first electromagnetic valve SV1 operates and the engagement element CE1 corresponding to the second electromagnetic valve SE1 does not operate.

An explanation is made on (b) State in which the spool 32 is positioned at the first position P1, the first electromagnetic valve SV1 is closed, and the second electromagnetic valve SE1 is open. In this state, the first chamber 34a is disconnected from the pump 22 because the first electromagnetic valve SV1 is closed. Accordingly, the pressure of the first chamber 34a is lower than the predetermined pressure and is, for example, the atmospheric pressure. The second chamber 34b is connected to the pump 22 via the passage 26b, the opened second electromagnetic valve SE1, the passage 25a, the switch valve 24 and the passage 25r. Accordingly, the pressure of the second chamber 34b is the line pressure. In addition, the third chamber 34c is connected to the pump 22 in a manner similar to the (a). Accordingly, the pressure of the third chamber 34c is the line pressure. This case corresponds to the case (2) described before, and the spool 32 is kept at the first position P1. In addition, in this case, the engagement element CE1 corresponding to the second electromagnetic valve SE1 operates and the engagement element CV1 corresponding to the first electromagnetic valve SV1 does not operate.

An explanation is made on (c) State in which the spool 32 is positioned at the first position P1, the first electromagnetic valve SV1 and the second electromagnetic valve SE1 are open. The state in which the first electromagnetic valve SV1 and the second electromagnetic valve SE1 are both open is set to be an abnormal state in the present embodiment. In this abnormal state, the first chamber 34a is connected to the pump 22 via the opened first electromagnetic valve SV1. Accordingly, the pressure of the first chamber 34a is the line pressure. The second chamber 34b is connected to the pump 22 via the opened second electromagnetic valve SE1. Accordingly, the pressure of the second chamber 34b is the line pressure. The third chamber 34c is connected to the pump 22 in a manner similar to the (a). Accordingly, the pressure of the third chamber 34c is the line pressure. This case corresponds to the case (3) described before, and the spool 32 receives the force towards the second side in the axial direction, that is, towards the left side in FIGS. 4 and 5, and moves to the second position P2.

When the spool 32 moves and then reaches the second position P2, the connection states of the passages at the first valve portion V1 and at the second valve portion V2 are switched or changed. First, at the first valve portion V1, the passage 27 connected to the actuator AV1 is disconnected from the passage 26a connected to the first electromagnetic valve SV1, and the passage 27 is connected to the passage 28 connected to the oil pan 21. Accordingly, at the first valve portion V1, the passages 26a and 27 between the first electromagnetic valve SV1 and the actuator AV1 of the engagement element CV1 are disconnected or interrupted from each other. Consequently, the engagement element CV1 is restricted from operating even in a state where the first electromagnetic valve SV1 is opened. As a result, the engagement elements CV1 and CE1 are restricted from being in the engaged states at the same time, and therefore an inconvenience associated therewith is restricted from occurring.

At the second valve portion V2, the passage 29 connected to the third chamber 34c is disconnected from the passage 25a connected to the pump 22, and the passage 29 is connected to the passage 28 connected to the oil pan 21. In addition, in this state, the first chamber 34a and the second chamber 34b are line pressures. Accordingly, the pressure of the third chamber 34c is lower than the predetermined pressure and is, for example, the atmospheric pressure. Consequently, this case corresponds to the case (4) described before, and the spool 32 is kept or maintained at the second position P2.

An explanation is made on (d) State in which, after the spool 32 has moved to the second position P2 in such a manner of (c), at least any one of the first electromagnetic valve SV1 and the second electromagnetic valve SE1 is closed. This case corresponding to any of the (4) to (6) described before, the pressure of the fluid in the third chamber 34c is lower than the predetermined pressure and the spool 32 is kept at the second position P2. Accordingly, the state in which the first valve portion V1 disconnects the passages 26a and 27 between the first electromagnetic valve SV1 and the actuator AV1 of the engagement element CV1 from each other is maintained or continued, and the state in which the engagement element CV1 does not operate is maintained. That is, according to the present embodiment, once the abnormal state (c) occurs, the engagement elements CV1 and CE1 are continuously restricted, by the shut-off valve 300, from being in the engaged states at the same time even though the open and closed states of the first electromagnetic valve SV1 and/or the second electromagnetic valve SE1 change after the occurrence of the abnormal state. Thus, the inconvenience associated with that the engagement elements CV1 and CE1 are in the engaged states at the same time is restricted from occurring.

From among the passages 26b1, 26b2 and 26b3 which are respectively connected to three different actuators AV1, the selector valve 400 exemplarily illustrated in FIG. 6 selectively connects a passage, of which the pressure becomes the highest of the passages 26b1, 26b2 and 26b3, to the passage 26b positioned at the downstream-side. A valve section 41 is provided between the passage 26b1 and the passage 26b, and includes a valve body 41a, including for example a ball, which is movable between a first location L1 and a second location L2. In a state where the valve body 41a is in the first location L1, the valve body 41a closes the passage 26b1 and opens the passage 26b2. In a state where the valve body 41a is in the second location L2, the valve body 41a closes the passage 26b2 and opens the passage 26b1. In a case where the pressure of the passage 26b1 is higher than the pressure of the passage 26b2, the valve body 41a moves to the second location L2 and selectively opens the passage 26b1. In a case where the pressure of the passage 26b2 is higher than the pressure of the passage 26b1, the valve body 41a moves to the first location L1 and selectively opens the passage 26b2. That is, the passage 26b1 or the passage 26b2, whichever including the higher pressure, is connected to a passage 43 via the valve section 41. In addition, a valve section 42 includes a valve body 42a that is similar to the valve body 41a, and the valve section 42 is configured in a manner similar to the valve section 41. Thus, in a case where the pressure of the passage 43 is higher than the pressure of the passage 26b3, the valve body 42a moves to the second location L2 and selectively opens the passage 43. In a case where the pressure of the passage 26b3 is higher than the pressure of the passage 43, the valve body 42a moves to the first location L1 and selectively opens the passage 26b3. That is, the passage 43 or the passage 26b3, whichever including the higher pressure, is connected to the passage 26b via the valve section 42. At the valve section 41, in a case where both pressures of the passages 26b1 and 26b2, which are positioned at an inlet-side, are high, that is, in a case where the pressure of the passage 26b1 and the pressure of the passage 26b2 are substantially equal to each other, the valve body 41a does not block the passage 43, which is positioned at an outlet-side, and connects both passages 26b1 and 26b2 at the inlet-side to the passage 43 at the outlet-side. At the valve section 42, in a case where both pressures of the passages 43 and 26b3, which are at the inlet-side, are high, that is, in a case where the pressure of the passage 43 and the pressure of the passage 26b3 are substantially equal to each other, the second valve body 42a does not block the passage 26b, which is at the outlet-side, and connects both passages 43 and 26b3 at the inlet-side to the passage 26b at the outlet-side. Consequently, according to the present embodiment, by connecting the passages 26b1 to 26b3 to the plural engagement elements CE1 that should not be in the engaged states in parallel with or concurrently with the engagement element CV1, at least one of the plural engagement elements CE1 and the engagement element CV1 are restricted from being in the engaged states at the same time, with the use of the single shut-off valve 300. The number of passages 26b1 to 26b3 which are at the inlet-side and are connected to the passage 26b is not limited to three.

As described above, according to the fluid pressure control circuit 200 of the present embodiment, for example, in a case where the first electromagnetic valve SV1 and the second electromagnetic valve SE1 are open, the shut-off valve 300 closes the passages 26a and 27 which are arranged between the first electromagnetic valve SV1 and the engagement element CV1 corresponding to the first electromagnetic valve SV1 with the use of the fluid pressure to establish the closed state. In addition, the shut-off valve 300 maintains or keeps the closed state of the passages 26a and 27, with the use of the pressure of the fluid. Thus, for example, according to the present embodiment, because the state in which the passages 26a and 27 between the first electromagnetic valve SV1 and the corresponding engagement element CV1 are closed by the shut-off valve 300 is maintained by the pressure of the fluid, the state in which the plural engagement elements CV1 and CE1 are restricted from being in the engaged states in parallel with each other is maintained easily. In addition, because the disengaged or interrupted state established by the shut-off valve 300 is maintained by the pressure of the fluid, manufacturing labor hours or costs may be reduced easier compared to a configuration in which, for example, sensors and/or actuators are provided to take an electrical measure.

In addition, according to the present embodiment, for example, in a case where the pressures of the fluids of the first chamber 34a and the second chamber 34b which correspond to the first electromagnetic valve SV1 and the second electromagnetic valve SE1 becomes higher than the predetermined pressures, the spool 32 moves towards the second position P2. In a state where the spool 32 is positioned at the second position P2, the first valve portion V1 closes the passages 26a and 27 which are arranged between the first electromagnetic valve SV1 and the engagement element CV1, and the second valve portion V2 switches the passages such that the pressure of the fluid of the third chamber 34c reduces. Then, in a state where the pressure of the fluid of the third chamber 34c is lower than the predetermined pressure, and at least one of the pressures of the fluids in the first chamber 34a and the second chamber 34b is higher than the predetermined pressure, the spool 32 is positioned at the second position P2. Accordingly, for example, due to the switch of the connection states of the second valve portion V2 depending on the position of the spool 32 (i.e., the valve body), the present embodiment provides the configuration that the state, in which the passages 26a and 27 between the first electromagnetic valve SV1 and the corresponding engagement element CV1 are closed by the first valve portion V1, is kept by the pressure of the fluid. In addition, the function of keeping the spool 32 at the second position P2 can be incorporated into or included in the shut-off valve 300, and thus the manufacturing labor hours or costs may be reduced easier compared to the configuration in which, for example, the sensors and/or actuators are provided to take the electrical measure.

According to the present embodiment, for example, from among the plural passages 26b1, 26b2 and 26b3 at the inlet-side which are respectively connected to the plural second electromagnetic valves SE1, the selector valve 400 connects the passage including the highest pressure of the passages 26b1, 26b2 and 26b3 to the passage 26b at the outlet-side which is connected to the second chamber 34b of the shut-off valve 300. Accordingly, with the use of the selector valve 400, for example, in a case where there are plural engagement elements CE1 that should not be in the engaged states in parallel with the engagement element CV1 corresponding to the first electromagnetic valve SV1, the shut-off valve 300 can be commonly used or can be shared between the plural engagement elements CE1.

The aforementioned embodiment is presented as an example and is not provided to intend to limit the scope of the disclosure. This embodiment may be implemented in various manners other than the presented example, and various omissions, substitutions, combinations and/or changes may be provided without departing from the scope of the disclosure. The structure and/or configuration in the example are applicable with partial switch or replacement. In addition, specification (structure, kind, direction, shape and configuration, size, length, width, height, number, arrangement, position, for example) of each structure and/or shape and configuration may be appropriately changed for the implement. For instance, the configurations of the shut-off valve and the selector valve are not limited to the above-mentioned configurations. In addition, for example, the arrangement of the chambers, the arrangement and type of the valves, and/or the configuration of the transmission and the fluid pressure control circuit are not limited to the above-mentioned. Further, the embodiment is applicable to other transmission and/or to other fluid pressure control circuit than the transmission and/or fluid pressure control circuit that are disclosed in the embodiment.

According to the aforementioned embodiment, the fluid pressure control circuit 200 for the transmission 100, the transmission 100 includes the pump 22 and the plural engagement elements C1, C2, C3, B1, B2 switching between the engaged state and the disengaged state with the use of the fluid pressure of the fluid provided from the pump 22, the input shaft 100b, the output shaft 100c, the intermediate shaft 100d, the torque converter 101, the lockup clutch 102, the planetary gears PG1 to PG3 (i.e., the first rotary element) of the transmission 100 is engaged with one of the input shaft 100b, the output shaft 100c, the intermediate shaft 100d, the torque converter 101, the lockup clutch 102, the planetary gears PG1 to PG3 (i.e., the second rotary element), and the case 100a (i.e., the fixed element) of the transmission 100 in the engaged state, the input shaft 100b, the output shaft 100c, the intermediate shaft 100d, the torque converter 101, the lockup clutch 102, the planetary gears PG1 to PG3 (i.e., the first rotary element) is disengaged from the one of the input shaft 100b, the output shaft 100c, the intermediate shaft 100d, the torque converter 101, the lockup clutch 102, the planetary gears PG1 to PG3 (i.e., the second rotary element), and the case 100a (i.e., the fixed element) in the disengaged state, the fluid pressure control circuit 200 includes the plural electromagnetic valves SC1, SC2, SC3, SB1, SB2 each switching one of the engagement elements C1, C2, C3, B1, B2 between the engaged state and the disengaged state, one each of the electromagnetic valves SC1, SC2, SC3, SB1, SB2 is arranged at each of the plural engagement elements C1, C2, C3, B1, B2, the plural passages 26C1, 26C2, 26C3, 26B1, 26B2, 27C1, 27C2, 27C3, 27B1, 27B2, 27, 26a, 26b is configured to connect the engagement elements C1, C2, C3, B1, B2 to the pump 22, the first electromagnetic valve SV1 corresponds to one of the plural electromagnetic valves SC1, SC2, SC3, SB1, SB2, and switches one of the plural engagement elements CV1 between the engaged state and the disengaged state, the second electromagnetic valve SE1 corresponding to another of the plural electromagnetic valves SC1, SC2, SC3, SB1, SB2, and switches another of the plural engagement elements CE1 between the engaged state and the disengaged state, and the shut-off valve 300, in a case where the first electromagnetic valve SV1 and the second electromagnetic valve SE1 are open, closes the passages 26a, 27 among the first electromagnetic valve SV1, the engagement elements CV1 switched by the first electromagnetic valve SV1 and the pump 22 with the use of the fluid pressure to establish the closed state, the shut-off valve 300 maintains the closed state with the use of the fluid pressure.

According to the above described configuration, for example, the state in which the shut-off valve 300 closes the passages between the first electromagnetic valve SV1 and the corresponding engagement element CV1 is maintained by the pressure of the fluid easily, and therefore the state in which the plural engagement elements CV1, CE1 are restricted from being in the engaged states in parallel with each other is maintained easily.

According to the aforementioned embodiment, the shut-off valve 300 is provided with the first chamber 34a configured to connect to the pump 22 via the first electromagnetic valve SC1, SC2, SC3, SB1, SB2, SV1, the second chamber 34b configured to connect to the pump 22 via the second electromagnetic valve SC1, SC2, SC3, SB1, SB2, SE1, and the third chamber 34c configured to connect to the pump 22 via neither the first electromagnetic valve SC1, SC2, SC3, SB1, SB2, SV1 nor the second electromagnetic valve SC1, SC2, SC3, SB1, SB2, SE1, and the shut-off valve 300 includes the spool 32 facing towards the three of the first chamber 34a, the second chamber 34b and the third chamber 34c, and configured to be movable between the first position P1 and the second position P2 that is different from the first position P1, the spool 32 is positioned at the first position P1 in a case where only the first chamber 34a and the third chamber 34c from among the three chambers are connected to the pump 22 and in a case where only the second chamber 34b and the third chamber 34c from among the three chambers are connected to the pump 22, the spool 32 is positioned at the second position P2 in a case where all of the first chamber 34a, the second chamber 34b and the third chamber 34c are connected to the pump 22, in a case where only the first chamber 34a and the second chamber 34b from among the three chambers are connected to the pump 22, in a case where only the first chamber 34a from among the three chambers is connected to the pump 22, and in a case where only the second chamber 34b from among the three chambers is connected to the pump 22, the first valve portion V1 opens the passages 26a, 27 between the first electromagnetic valve SC1, SC2, SC3, SB1, SB2, SV1 and the engagement element C1, C2, C3, B1, B2 corresponding to the first electromagnetic valve SC1, SC2, SC3, SB1, SB2, SV1 in a case where the spool 32 is positioned at the first position P1 and closes the passages 26a, 27 between the first electromagnetic valve SC1, SC2, SC3, SB1, SB2, SV1 and the engagement element C1, C2, C3, B1, B2 corresponding to the first electromagnetic valve SC1, SC2, SC3, SB1, SB2, SV1 in a case where the spool 32 is positioned at the second position P2, and the second valve portion V2 opens the passage 29 between the third chamber 34c and the pump 22 in a case where the spool 32 is positioned at the first position P1 and closes the passage 29 between the third chamber 34c and the pump 22 in a case where the spool 32 is positioned at the second position P2.

According to the above described configuration, for example, due to the switching of the connection states at the second valve portion V2 in accordance with the position of the spool 32, the state in which the first valve portion V1 closes the passages 26a, 27 between the first electromagnetic valve SV1 and the corresponding engagement element CV1 is kept or maintained by the pressure of the fluid.

According to the aforementioned embodiment, the fluid pressure control circuit 200 for the transmission 100 further includes the selector valve 400, from among the plural passages 26b1, 26b2, 26b3 at the inlet-side which are connected to the plural second electromagnetic valve SC1, SC2, SC3, SB1, SB2, SE1, respectively, connects the passage 26b1, 26b2, 26b3 including higher pressure with the passage 26b at the outlet-side which is connected to the second chamber 34b of the shut-off valve 300.

According to the above described configuration, for example, in a case where there exist plural engagement elements CE1 that should not be in the engaged states in parallel with the engagement element CV1 that corresponds to the first electromagnetic valve SV1, the shut-off valve 300 can be commonly used or can be shared between the plural engagement elements CE1.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A fluid pressure control circuit for a transmission, the transmission including
    a fluid pressure source, and
    a plurality of engagement elements switching between an engaged state and a disengaged state with the use of fluid pressure of fluid provided from the fluid pressure source, a first rotary element of the transmission being engaged with one of a second rotary element of the transmission and a fixed element of the transmission in the engaged state, the first rotary element being disengaged from the one of the second rotary element and the fixed element in the disengaged state, the fluid pressure control circuit comprising:
    a plurality of electromagnetic valves each switching one of the engagement elements between the engaged state and the disengaged state, one each of the electromagnetic valves being arranged at each of the plurality of engagement elements;
    a plurality of passages configured to connect the engagement elements to the fluid pressure source;
    a first electromagnetic valve corresponding to one of the plurality of electromagnetic valves, and switching one of the plurality of engagement elements between the engaged state and the disengaged state;
    a second electromagnetic valve corresponding to another of the plurality of electromagnetic valves, and switching another of the plurality of engagement elements between the engaged state and the disengaged state; and
    a shut-off valve, in a case where the first electromagnetic valve and the second electromagnetic valve are open, closing the passages among the first electromagnetic valve, the engagement elements switched by the first electromagnetic valve and the fluid pressure source with the use of the fluid pressure to establish a closed state, the shut-off valve maintaining the closed state with the use of the fluid pressure.

2. The fluid pressure control circuit for the transmission according to claim 1, wherein
    the shut-off valve is provided with a first chamber configured to connect to the fluid pressure source via the first electromagnetic valve, a second chamber configured to connect to the fluid pressure source via the second electromagnetic valve, and a third chamber configured to connect to the fluid pressure source via neither the first electromagnetic valve nor the second electromagnetic valve, and
    the shut-off valve includes:
        a valve body facing towards the three of the first chamber, the second chamber and the third chamber, and configured to be movable between a first position and a second position that is different from the first position,
        the valve body being positioned at the first position in a case where only the first chamber and the third chamber from among the three chambers are connected to the fluid pressure source and in a case where only the second chamber and the third chamber from among the three chambers are connected to the fluid pressure source,
        the valve body being positioned at the second position in a case where all of the first chamber, the second chamber and the third chamber are connected to the fluid pressure source, in a case where only the first chamber and the second chamber from among the three chambers are connected to the fluid pressure source, in a case where only the first chamber from among the three chambers is connected to the fluid pressure source, and in a case where only the second chamber from among the three chambers is connected to the fluid pressure source, a first valve portion opening a passage between the first electromagnetic valve and the engagement element corresponding to the first electromagnetic valve in a case where the valve body is positioned at the first position and closing the passage between the first electromagnetic valve and the engagement element corresponding to the first electromagnetic valve in a case where the valve body is positioned at the second position; and a second valve portion opening a passage between the third chamber and the fluid pressure source in a case where the valve body is positioned at the first position and closing the passage between the third chamber and the fluid pressure source in a case where the valve body is positioned at the second position.

3. The fluid pressure control circuit for the transmission according to claim 2, further comprising:

a selector valve, from among a plurality of passages at an inlet-side which are connected to the plurality of second electromagnetic valves, respectively, connecting the passage including higher pressure with a passage at an outlet-side which is connected to the second chamber of the shut-off valve.

\* \* \* \* \*